W. STUEBING, Jr. & L. J. VAN GUELPEN.

MACHINE FOR INKING OR COLORING THE EDGES OF LEATHER OR OTHER MATERIAL.

APPLICATION FILED JULY 11, 1916.

Reissued Aug. 21, 1917.

14,345.

2 SHEETS—SHEET 1.

Witnesses
L M Dunlap
Ben Siegel

Inventors—
William Stuebing Jr.,
and Louis J. Van Guelpen
By Joshua R. H. Potts
Attorney W. STUEBING, Jr. & L. J. VAN GUELPEN.

MACHINE FOR INKING OR COLORING THE EDGES OF LEATHER OR OTHER MATERIAL.

APPLICATION FILED JULY 11, 1916.

Reissued Aug. 21, 1917.

14,345.

2 SHEETS—SHEET 2.

Witnesses
L. M. Dunlap
Ben Siegel

Inventors -
William Stuebing Jr.,
and Louis J. Van Guelpen
By John W. Freeh
Attorney

UNITED STATES PATENT OFFICE.

WILLIAM STUEBING, JR., AND LOUIS J. VAN GUELPEN, OF CINCINNATI, OHIO.

MACHINE FOR INKING OR COLORING THE EDGES OF LEATHER OR OTHER MATERIAL.

14,345. Specification of Reissued Letters Patent. Reissued Aug. 21, 1917.

Original No. 1,190,246, dated July 4, 1916, Serial No. 23,239, filed April 22, 1915. Application for reissue filed July 11, 1916. Serial No. 108,731.

*To all whom it may concern:*

Be it known that we, WILLIAM STUEBING, Jr., and LOUIS J. VAN GUELPEN, citizens of the United States, residing at Cincinnati, in the county of Hamilton, State of Ohio, have invented a Machine for Inking or Coloring the Edges of Leather or other Material, of which the following is a specification.

Our invention relates to a wick submerged in a vessel containing coloring liquid and operates in connection with a revolving spindle and the objects of our improvements are, first, to provide a machine for the uniform distribution of coloring liquid upon the edges of leather or other material, so as to make application of the coloring liquid to the edges only, and not to any portion of the lateral surface of the leather or other material; second, to construct the aforesaid machine so that all parts may be disconnected and cleaned, thus insuring uniform continuous distribution of the coloring liquid and a perfect working device. We attain these objects by the mechanism illustrated in the accompanying drawings, in which—

Figure 1:
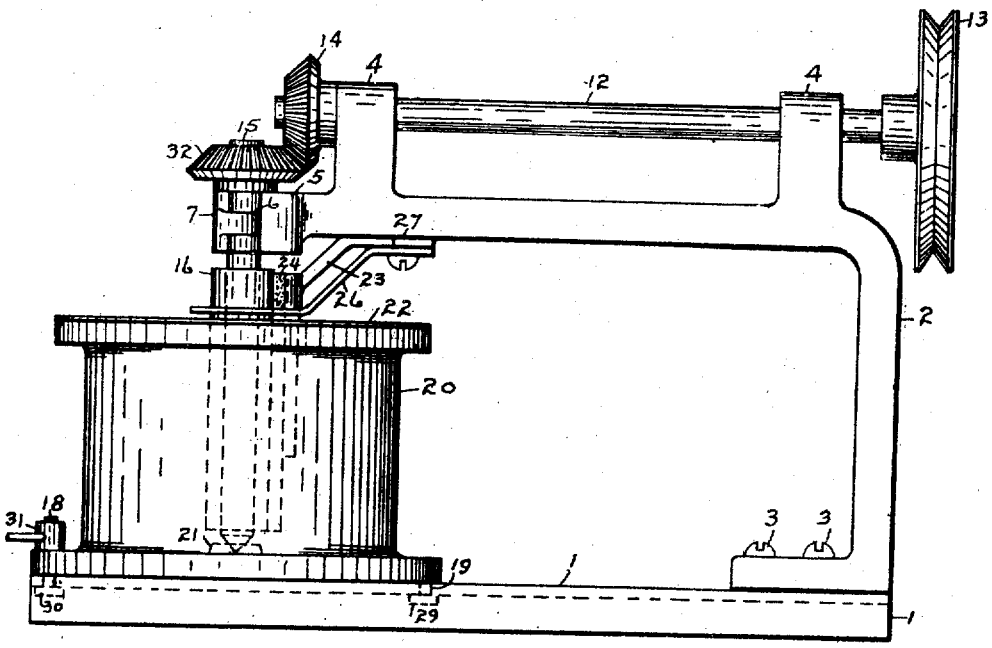
Figure 2:
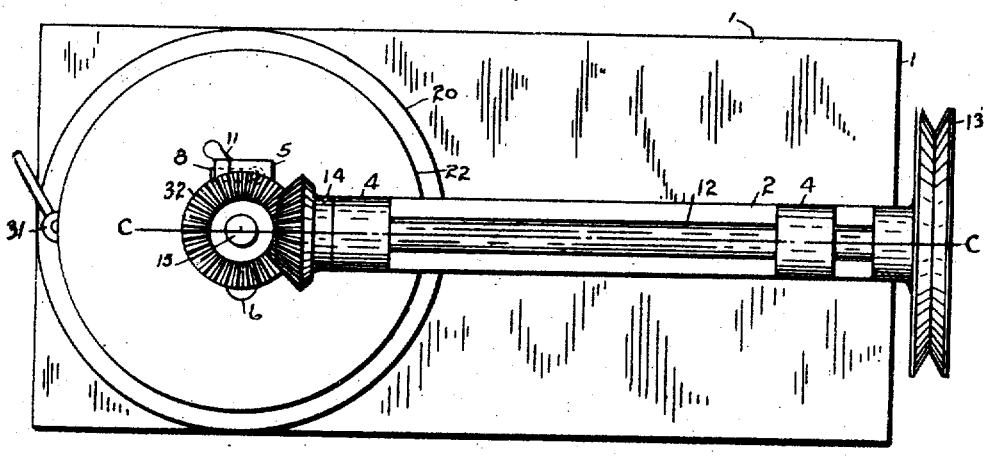
Figure 3:
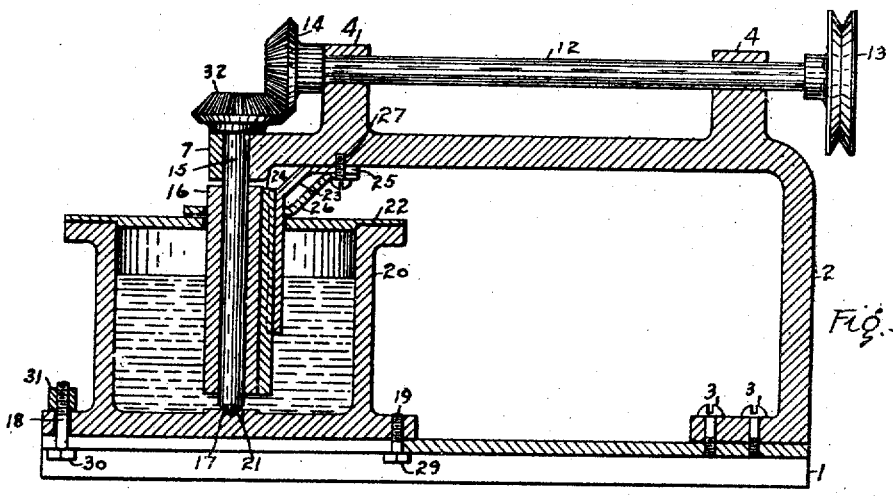
Figure 4:
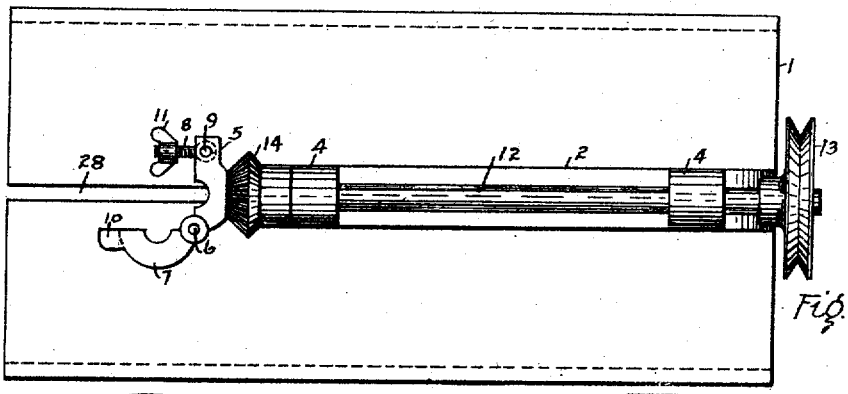
Figure 5:
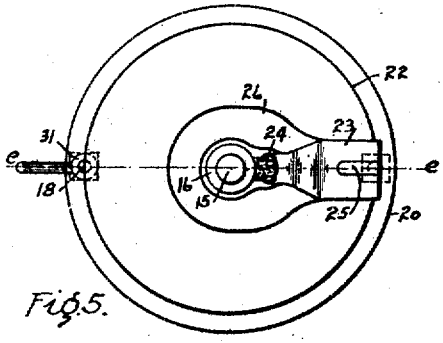
Figure 6:
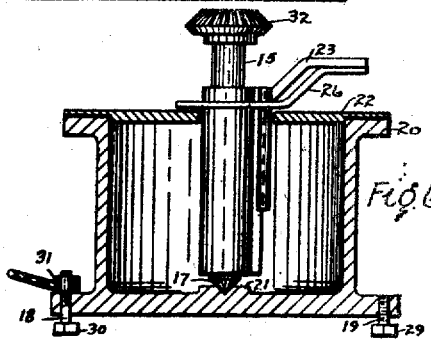

Figure 1— represents a front elevation. Fig. 2— represents a plan view of Fig. 1. Fig. 3— represents a section view of Fig. 2 on line C—C. Fig. 4— represents same view as Fig. 2 with the vessel and spindle removed. Fig. 5— represents a plan view of the vessel and spindle as shown in Fig. 1 with the driving gear removed. Fig. 6— represents a section view of vessel and spindle on line *e—e* of Fig. 5 showing the driving gear of spindle attached.

Our machine consists of a base (1) to which we attach at its rear end arm (2), by means of screws (3—3). At the top of the arm (2) we place bearings (4—4) and at the forward end of arm (2) we have a half bearing (5). Pivotally connected to the half bearing (5) at the point (6), we have the half box (7). At the other side of the half bearing (5) we pivotally connect the screw (8) at the point (9). At the other end of half box (7) we place a slot (10). Slot (10) is so placed as to allow the screw (8) to pass through slot (10) when the two half bearings (5—7) are connected, thus forming a complete bearing. The bearing then is locked together by means of a wing nut (11) on screw (8) as shown in Fig. 2. Through the bearings (4—4) we revolve the shaft (12). At the rear end of shaft (12) we place the driving pulley (13). At the forward end of shaft (12) we attach the miter gear (14). Through the combination of the half bearing (5) and half box (7), when they are locked together, we operate the spindle (15).

A porous shell (16) is fastened around the surface of spindle (15). The spindle (15) has a tapered end (17). At the upper end of spindle (15) we attach the miter gear (32), which meshes with miter gear (14) on shaft (12) as shown in Fig. 1.

Fastened to the base (1) by means of screws (18—19) we have the vessel (20). At the bottom, and in the center of vessel (20), we place the bearing (21). The vessel (20) is so placed and fastened on base 1, as to allow the bearing point (21) in vessel (20) to be vertically beneath the center of the combination half bearings (5—7) when they are locked together.

In the center bearing (21) of vessel (20) we revolve the center point (17) of spindle (15). At the top of vessel (20) we place the cover (22) with a hole in its center large enough to allow the spindle (15) to pass through the cover without coming into contact with same.

Fastened to the arm (2) at point (27), we have an extending arm (23), which reaches down into the vessel (20) as shown in Fig. 3. The vertical extending part of arm (23), is so arranged as to admit of a felt wick (24) as shown in Fig. 5. The wick (24) is made of felt or other fibrous substance and also extends downward into vessel (20). In the upper portion of arm (23), we have a slot (25) as shown in Fig. 5. The slot (25) allows the arm (23), which carries wick (24), to be adjustable to and away from the spindle (15). The wick (24) must be so adjusted as to come into contact with the porous shell (16) on spindle (15). Also fastened at point (27), we have the extending arm (26), which is so arranged as to extend around the shell (16), wick (24) and arm (23) as shown in Fig. 5. The purpose of this extending arm is to prevent the material from buckling when held between the cover (22) and extending arm (26) and against the revolving shell (16).

In order to make vessel (20) removable, so as to allow the operator to clean same, we adopt the following means. In base (1) we cut the slot (28) extending rearward. Through slot (28), we place the screws (18—19), which are in turn fastened to vessel (20) as shown in Fig. 3. On screw (19) we have a head (29) and on screw (18) we have a head (30). The heads (29—30) are larger in diameter than the width of the slot (28). Thus it can be seen that the screw (19) with its head (29) will lock the vessel (20) to base (1). On screw (18), we put the lock nut (31) and by tightening lock nut (31) we securely fasten the vessel (20) to the base (1).

To operate the machine, power is applied to pulley (13) which revolves shaft (12) imparting rotating motion to the vertical spindle (15) through the miter gear (14) on shaft (12) and miter gear (32) on spindle (15). We now place coloring liquid in vessel (20) as shown in Fig. 3. The liquid is now drawn up by means of wick (24) which extends down into the liquid as in the manner of oil-burning lamps. Wick (24) is so adjusted to the surface of the shell (16) as to distribute the liquid evenly on the surface of shell (16). Through the agency of wick (24), drawing the liquid from vessel (20), the liquid is carried up and distributed upon the unsubmerged part of shell (16). The material to be colored on its edges is then guided between the plate (22) and arm (26) and held against the surface of the shell (16). It is then fed forward by hand until its entire length has been colored.

We claim:

1. The combination of a base and an upwardly and forwardly extending arm fastened to said base, a vessel fastened to said base, and adapted to be filled with coloring liquid, a vertical revolving spindle centered in said vessel and covered with a porous shell, and submerged in said coloring liquid in said vessel and extending above said vessel and journaled in said arm attached to said base; means for driving said spindle revolving in said coloring liquid, and means for automatically distributing said coloring liquid to the unsubmerged part of the shell surrounding said spindle.

2. The combination of a base and an upwardly and forwardly extending arm fastened to said base, a vessel fastened to said base and adapted to be filled with coloring liquid; a vertical revolving spindle centered in said vessel and covered with a porous shell and submerged in said coloring liquid in said vessel, and extending above said vessel and journaled in said arm attached to said base; means for driving said spindle revolving in said coloring liquid; a wick of felt or other fibrous substance so placed in said coloring liquid as to draw the said coloring liquid up to and distribute the said coloring liquid upon the unsubmerged portion of the shell surrounding said spindle; means for holding said wick or other fibrous substance; and means for adjusting said wick to, and away from the surface of said spindle.

3. In an inking or coloring machine of the class described, a vessel for holding the liquid, a revoluble shell extending therein, a wick combined with said shell, said wick drawing up the liquid, the said shell distributing said liquid upon its periphery, so that the material to be colored may be held against said shell to be acted upon.

4. In an inking or coloring machine of the class described, a vessel for holding the liquid, a revoluble shell extending therein, a wick combined with said shell, said wick drawing up the liquid, the said shell distributing said liquid upon its periphery, so that the material to be colored may be held against said shell to be acted upon, and means for preventing the material from buckling while the same is being operated upon.

5. In an inking or coloring machine a vessel for holding the liquid, a revoluble vertical shell extending therein, a vertically disposed wick combined with said shell, said wick drawing up the liquid, the said shell distributing said liquid upon its periphery, so that the material to be colored may be held against said shell to be acted upon.

6. In an inking or coloring machine, a vessel for holding the liquid, a revoluble extension entering the same, an absorbing material combined with said extension, said absorbing material drawing up the liquid so that the same may be distributed upon the periphery of the revoluble extension so that the material to be colored can be acted upon by holding the same against said revoluble extension.

7. In an inking or coloring machine a vessel for holding the liquid, a revolving extension entering the same, an absorbing material combined with the said extension and also entering therein, the absorbing material raising the liquid by capillary attraction so that the same will be applied to the periphery of the revolving extension as the same revolves.

8. In an inking or coloring machine a vessel for holding the liquid, a revolving porous extension entering the same, an absorbing material combined with the said extension and also entering therein, the absorbing material raising the liquid by capillary attraction so that the same will be applied to the periphery of the revolving extension as the same revolves.

WILLIAM STUEBING, JR.
LOUIS J. VAN GUELPEN.

Witnesses:
H. E. CARSTENS,
ED. JAMES.

Copies of this patent may be obtained for five cents each, by addressing the "Commissioner of Patents, Washington, D. C."